United States Patent
Nagai et al.

(10) Patent No.: US 11,111,018 B2
(45) Date of Patent: Sep. 7, 2021

(54) AERIAL VEHICLE AND CONTROL METHOD FOR AERIAL VEHICLE

(71) Applicant: HONDA MOTOR CO., LTD., Tokyo (JP)

(72) Inventors: Makoto Nagai, Wako (JP); Yo Ito, Tokyo (JP); Takahiro Iijima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/982,103

(22) PCT Filed: Mar. 19, 2019

(86) PCT No.: PCT/JP2019/011304
§ 371 (c)(1),
(2) Date: Sep. 18, 2020

(87) PCT Pub. No.: WO2019/181894
PCT Pub. Date: Sep. 26, 2019

(65) Prior Publication Data
US 2021/0107643 A1    Apr. 15, 2021

(30) Foreign Application Priority Data

Mar. 19, 2018 (JP) .............................. JP2018-051374

(51) Int. Cl.
*B64D 25/00* (2006.01)
*B64C 39/02* (2006.01)
*B64D 47/08* (2006.01)

(52) U.S. Cl.
CPC ............ *B64C 39/024* (2013.01); *B64D 25/00* (2013.01); *B64D 47/08* (2013.01);
(Continued)

(58) Field of Classification Search
CPC ............ B64C 39/024; B64C 2201/027; B64C 2201/108; B64C 2201/146; B64C 39/02; B64D 25/00
See application file for complete search history.

(56) References Cited

U.S. PATENT DOCUMENTS

| 10,011,371 B2 | 7/2018 | Sabe et al. |
| 2016/0318615 A1 | 11/2016 | Pick |

(Continued)

FOREIGN PATENT DOCUMENTS

| JP | 2016-137150 | 8/2016 |
| KR | 10-2017-0093579 | 8/2017 |
| WO | 2016/059877 | 4/2016 |

OTHER PUBLICATIONS

International Search Report and Written Opinion for International Application No. PCT/JP2019/011304 dated Jun. 4, 2019, 9 pages.

*Primary Examiner* — Brian M O'Hara
*Assistant Examiner* — Keith L Dixon
(74) *Attorney, Agent, or Firm* — Amin, Turocy & Watson, LLP

(57) ABSTRACT

The present invention provides an aerial vehicle for which landing or movement of the aerial vehicle downward or in the direction of gravitational force, for example, can be easily identified by people in the surrounding area. Also provided is a control method for the aerial vehicle. The aerial vehicle is provided with an alerting device that issues warnings in the velocity vector direction of the aerial vehicle. The alerting device may be equipped with a light projecting device that emits visible light toward the velocity vector direction of the aerial vehicle. The alerting device may also be equipped with a warning sound outputting device that outputs a warning sound toward the velocity vector direction of the aerial vehicle.

9 Claims, 6 Drawing Sheets

(52) U.S. Cl.
CPC .. *B64C 2201/027* (2013.01); *B64C 2201/108* (2013.01); *B64C 2201/146* (2013.01)

(56) References Cited

U.S. PATENT DOCUMENTS

2017/0269594 A1* 9/2017 Sydnor ................. B64C 39/024
2020/0027230 A1* 1/2020 Zhao ........................ G06T 7/20

* cited by examiner

AERIAL VEHICLE AND CONTROL METHOD FOR AERIAL VEHICLE

TECHNICAL FIELD

The present invention relates to a flying body and a flying body control method (an aerial vehicle and a control method for the aerial vehicle).

BACKGROUND ART

Japanese Laid-Open Patent Publication No. 2016-137150 has an objective of providing a flying body that can land gently without falling when the battery runs out (see paragraph [0009] and the ABSTRACT). To realize this objective, a flying body 10 of Japanese Laid-Open Patent Publication No. 2016-137150 (see the ABSTRACT, Claim 1, and FIG. 1) includes one wing member 11, at least one arm 12 extending from the wing member 11, a motor 13 attached to the arm 12, and a propeller 15. The propeller 15 prompts turning of the wing member 11 attached to a motor shaft 14 of the motor 13. Furthermore, the flying body 10 includes a power supply member (battery) 16 loaded on the wing member 11, a control section 17 loaded on the wing member 11, a picking portion 18, and a leg portion 19. The picking portion 18 extends upward from the wing member 11 at a position near the overall center of mass. The leg portion 19 extends downward from the wing member 11 at a position near the overall center of mass.

Japanese Laid-Open Patent Publication No. 2016-137150 (see the ABSTRACT and paragraph [0014]) describes the following as the operational effect of the flying body 10. Specifically, the flying body 10 descends freely while turning freely, the leg portion 19 contacts a ground surface 35, and then the wing member 11 contacts the ground surface 35. Accordingly, since the flying body 10 lands gently without falling, there is no worry about the wing member 11 and propeller 15 being damaged.

SUMMARY OF INVENTION

In the manner described above, according to Japanese Laid-Open Patent Publication No. 2016-137150, even when the battery 16 runs out, the flying body 10 is intended to land gently without falling (see paragraph [0009] and the ABSTRACT). However, in Japanese Laid-Open Patent Publication No. 2016-137150, there is no consideration of people, animals, or apparatuses (objects whose positions could be changed due to the flying body 10 falling or the like) in the vicinity of the flying body 10 when the flying body 10 falls. This is relevant not only for a case where the battery 16 has run out, but also for cases where the flying body 10 moves downward or lands when the battery 16 has not run out.

The present invention has been devised in order to solve this type of problem, and has the object of providing a flying body that allows nearby people and the like to easily recognize that the flying body is landing or moving downward or in the direction of gravity, for example, as well as a control method for this flying body.

A flying body according to the present invention includes a warning apparatus configured to provide a warning in a velocity vector direction of the flying body.

According to the present invention, the warning is provided in the velocity vector direction of the flying body. Accordingly, it is easy for nearby people and the like to recognize the presence of the flying body when the flying body moves downward or in the direction of gravity (including falling and landing), for example.

The warning apparatus may include a light projection apparatus configured to radiate visible light in the velocity vector direction of the flying body. In this way, the visible light is radiated in the velocity vector direction of the flying body. Accordingly, it is easy for nearby people and the like to recognize the presence of the flying body due to the visible light when the flying body moves downward or in the direction of gravity, for example. Furthermore, when the flying body that is moving downward or in the direction of gravity uses the image capturing section to acquire an image of the planned arrival location on the ground and the surrounding region thereof and this image is used to determine contact with the ground, it is easy to judge the state of the planned arrival location and the surrounding region thereof.

The light projection apparatus may be configured to radiate the visible light along a rotational center axis direction of a rotating wing of the flying body. In this way, by fixing the visible light radiation direction relative to the main body of the flying body or the rotational axis of the rotating wing, it is possible to easily radiate the visible light downward from the flying body.

Alternatively, the light projection apparatus may include a light source configured to generate the visible light and a light source actuator configured to adjust a radiation direction of the visible light. Furthermore, the flying body may include a direction detecting section configured to detect the velocity vector direction of the flying body, and a light projection control section configured to control the light source and the light source actuator. Yet further, the light projection control section may be configured to control the light source actuator to radiate the visible light in the velocity vector direction of the flying body.

In this way, even when the flying body moves in a direction diagonal to the vertical direction, it is easy to recognize the presence of the flying body from the planned arrival position on the ground and the surrounding region thereof. Furthermore, when the flying body that is moving in the direction diagonal to the vertical direction uses the image capturing section to acquire an image of the planned arrival location and the surrounding region thereof and this image is used to arrive at the ground, it is easy to judge the state of the planned arrival location and the surrounding region thereof.

The flying body may include a propulsion source for the flying body, a first power source configured to drive the propulsion source, and a second power source that is different from the first power source and is configured to drive the warning apparatus. In this way, even when an abnormality has occurred in the first power system that includes the first power source, it is possible to drive the warning apparatus with the second power source and provide the warning downward or in the direction of gravity from the flying body.

The warning apparatus may provide the warning when an abnormality has occurred in a first power system including the first power source. In this way, even when an abnormality has occurred in the first power system that includes the first power source, it is possible to drive the warning apparatus.

The warning apparatus may include an abnormality notifying section that outputs an abnormality signal providing notification about an abnormality to an external device, when the abnormality has occurred in the first power system that includes the first power source. In this way, when an abnormality occurs in the first power system and the rotating wing does not operate correctly, it is possible to take countermeasures via the external device.

The flying body may include a posture stabilizing portion that stabilizes a posture of the flying body when descending. In this way, when the flying body descends, it is possible to stabilize the direction of the warning. For example, it is possible to use a wing provided on the main body of the flying body or a weight provided on the bottom side of the main body of the flying body, as the posture stabilizing portion.

The warning apparatus may include a warning sound output apparatus configured to output a warning sound in the velocity vector direction of the flying body. In this way, the warning sound is output in the velocity vector direction of the flying body. Accordingly, when the flying body moves downward or in the direction of gravity, for example, it is easy to recognize the presence of the flying body from the surrounding region.

A flying body control method according to the present invention is characterized in that a warning apparatus provides notification in a velocity vector direction of a flying body when the flying body moves downward or in a direction of gravity.

According to the present invention, the warning is provided in the velocity vector direction of the flying body when the flying body moves downward or in the direction of gravity. Accordingly, it is easy for nearby people and the like to recognize the presence of the flying body when the flying body moves downward or in the direction of gravity.

According to the present invention, it is easy for nearby people and the like to recognize that the flying body is landing or moving downward or in the direction of gravity, for example.

DESCRIPTION OF EMBODIMENTS

A. First Embodiment

<A-1. Configuration>
[A-1-1. Overall Configuration]

Figure 1:
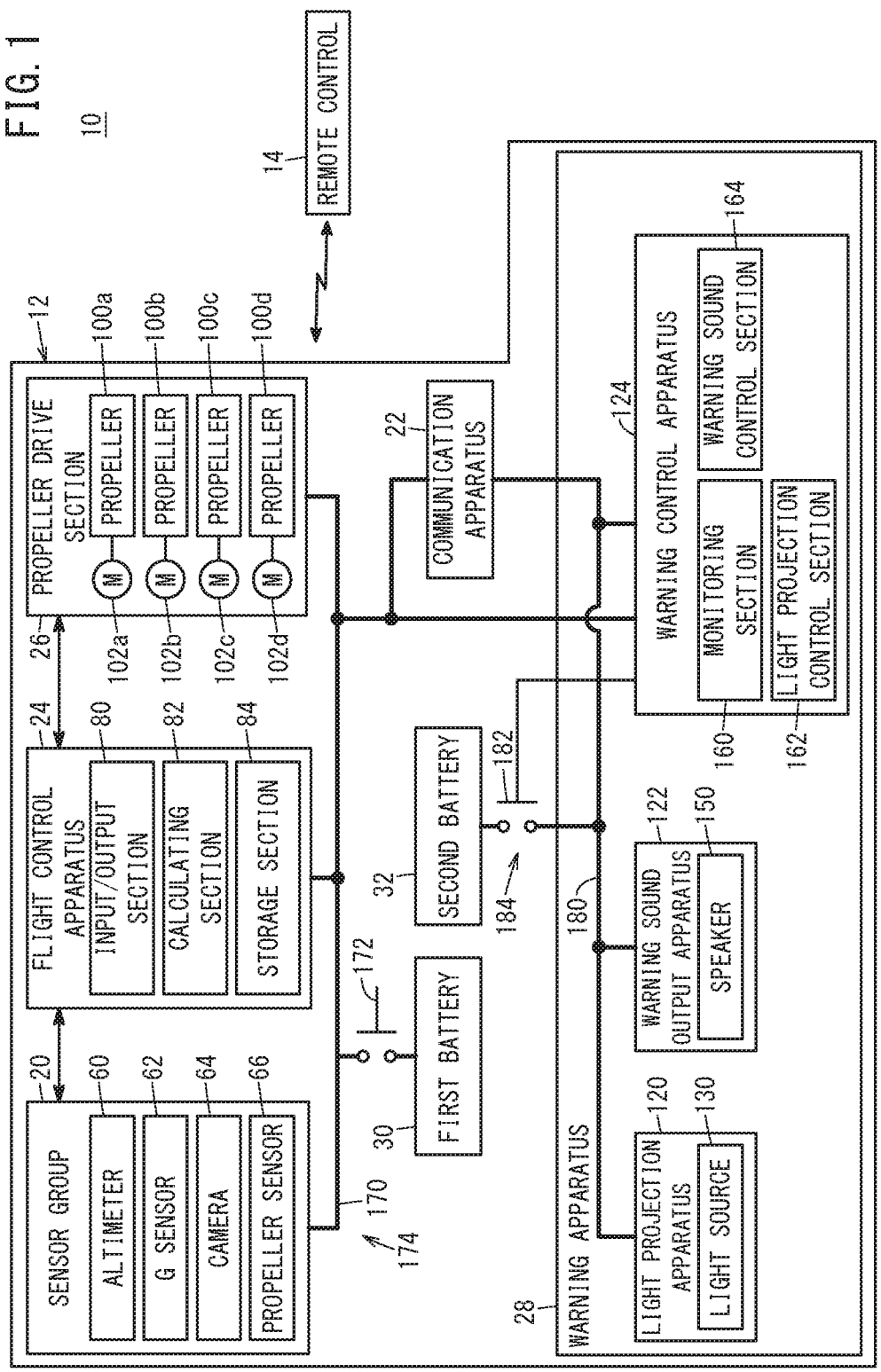
FIG. 1 is an overall configurational diagram of the basics of a drone system that includes a drone serving as a flying body, according to a first embodiment of the present invention.
Figure 2:
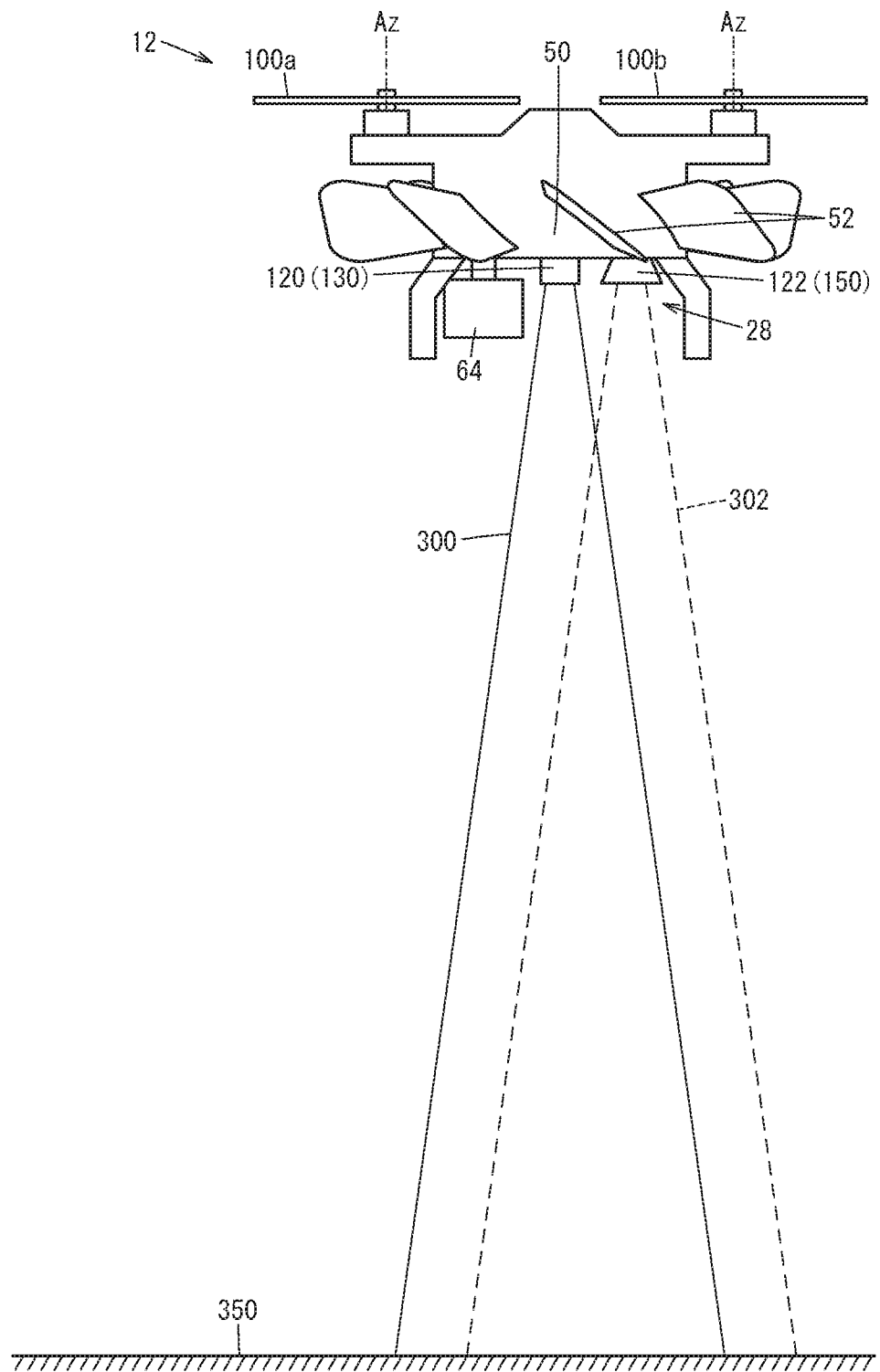
FIG. 2 shows an example of a usage state of the drone according to the first embodiment.

FIG. 1 is an overall configurational diagram of the basics of a drone system 10 that includes a drone 12 serving as a flying body, according to a first embodiment of the present invention. FIG. 2 shows an example of a usage state of the drone 12 according to the first embodiment. The drone system 10 includes a remote control 14 (see FIG. 1) in addition to the drone 12. The drone 12 flies according to an input manipulation made by a user to the remote control 14. As described further below, the drone 12 may be used in other ways.

As shown in FIG. 1, the drone 12 includes a sensor group 20, a communication apparatus 22, a flight control apparatus 24, a propeller drive section 26, a warning apparatus 28, a first battery 30, and a second battery 32. Furthermore, as shown in FIG. 2, a main body 50 of the drone 12 (also referred to below as a "drone body 50") is provided with posture stabilizing wings 52 (posture stabilizing portion) that stabilizes the posture of the drone 12 when descending.

[A-1-2. Sensor Group 20]

As shown in FIG. 1, the sensor group 20 includes an altimeter 60, an acceleration sensor 62, a camera 64, and a propeller rotational velocity sensor 66 (also referred to below as a "propeller sensor 66"). The altimeter 60 detects the ground altitude H (also referred to below as the "altitude H") [m] of the drone 12. The acceleration sensor 62 detects the acceleration G [m/sec/sec] of the drone 12. The acceleration G includes an acceleration Gx in a front-rear direction, and acceleration Gy in a left-right direction, and an acceleration Gz in an up-down direction.

As shown in FIG. 2, the camera 64 is arranged in a bottom portion of the drone body 50 of the drone 12, and acquires an image Id of the drone 12 (also referred to below as a "drone image Id"). The camera 64 is a video camera that captures a moving image. Alternatively, the camera 64 may be capable of capturing both moving images and still images, or only still images. The camera 64 of the first embodiment is capable of adjusting its orientation (posture of the camera 64 relative to the drone body 50) using a camera actuator (not shown in the drawings). Alternatively, the camera 64 may be positionally fixed relative to the drone body 50. The propeller rotational velocity sensor 66 detects the rotational velocity Np [rpm] of each of a plurality of propellers 100a, 100b, 100c, and 100d.

The sensor group 20 may include a global positioning system sensor (also referred to below as a "GPS sensor"), a speedometer, a gyro sensor, and the like as needed. The GPS sensor detects a current position Pdcur of the drone 12. The speedometer detects a flight velocity Vd of the drone 12. The gyro sensor detects an angular velocity [rad/sec] of the drone 12. The angular velocity includes an angular velocity relative to an up-down axis (yaw), an angular velocity relative to a left-right axis (pitch), and an angular velocity relative to a front-rear axis (roll).

[A-1-3. Communication Apparatus 22]

The communication apparatus 22 is capable of performing wireless communication with the remote control 14 and the like, and includes a wireless antenna, for example.

[A-1-4. Flight Control Apparatus 24]The flight control apparatus 24 (flight control section) controls the flight, image capturing, and the like of the drone 12. As shown in FIG. 1, the flight control apparatus 24 includes an input/output section 80, a calculating section 82, and a storage section 84. The calculating section 82 performs in-flight image capturing control for controlling the image capturing of the drone 12.

The calculating section 82 includes a central processing unit (CPU), and operates by executing a program stored in the storage section 84. Some of the functions performed by the calculating section 82 can be realized using a logic IC (Integrated Circuit). This program may be supplied from an external server or the like (not shown in the drawings) via the communication apparatus 22. The calculating section 82 can form a portion of the program with hardware (circuit components).

The storage section 84 stores the programs and data used by the calculating section 82, and includes a random access memory (referred to below as a "RAM"). A volatile memory such as a register and a nonvolatile memory such as a flash memory can be used as the RAM. Furthermore, the storage section 84 may include a read only memory (ROM) in addition to the RAM. Yet further, the storage section 84 may include removable media (e.g. a flash memory) (not shown in the drawings) and a first slot (not shown in the drawings) that the removable media can be inserted into and removed from. Instead of or in addition to the removable media, a configuration may be used that transmits the drone image Id to an external device (e.g. a PC or external server) via the communication apparatus 22.

[A-1-5. Propeller Drive Section 26]

The propeller drive section 26 includes the plurality of propellers 100a, 100b, 100c, and 100d (referred to below collectively as "propellers 100") and a plurality of propeller actuators 102a, 102b, 102c, and 102d (referred to collectively as "propeller actuators 102"). The propeller actuators 102 includes electric motors, for example. In a case where the electric motors are AC motors, the propeller actuators 102 may include inverters that convert DC current to AC current. The number of propellers 100 (rotating wings) and propeller actuators 102 may be a number other than four (4). As described above, the rotational velocity Np of each propeller 100 is detected by the propeller rotational velocity sensor 66.

[A-1-6. Warning Apparatus 28]

(A-1-6-1. Basics of the Warning Apparatus 28)

The warning apparatus 28 issues a warning downward from the drone 12 when a propeller actuator 102 stops operating due to a lack of power in the first battery 30 and the drone 12 falls in the direction of gravity. As described further below, even if the propeller actuators 102 continue operating, the warning apparatus 28 may issue a warning downward (including a downward direction other than the direction of gravity). As shown in FIG. 1, the warning apparatus 28 includes a light projection apparatus 120, a warning sound output apparatus 122, and a warning control apparatus 124.

(A-1-6-2. Light Projection Apparatus 120)

The light projection apparatus 120 radiates visible light 300 downward from the drone 12 (or in the direction of gravity) (see FIG. 2). The light projection apparatus 120 includes a light source 130 that generates the visible light 300. The light source 130 radiates the visible light 300 along rotational axes Az (see FIG. 2) of the propellers 100.

(A-1-6-3. Warning Sound Output Apparatus 122)

The warning sound output apparatus 122 outputs a warning sound 302 downward from the drone 12 (or in the direction of gravity) (see FIG. 2). As shown in FIG. 1, the warning sound output apparatus 122 includes a speaker 150 that outputs the warning sound 302. The speaker 150 is a directional speaker, but may be a non-directional speaker instead.

(A-1-6-4. Warning Control Apparatus 124)

The warning control apparatus 124 controls the entire warning apparatus 28, and includes a monitoring section 160, a light projection control section 162, and a warning sound control section 164. The monitoring section 160 monitors whether the necessary power is being supplied to each propeller actuator 102 from the first battery 30. This monitoring is performed based on the rotational velocity Np of each propeller 100, for example (details of which are described further below).

The light projection control section 162 controls the light projection apparatus 120. In the first embodiment, the light projection apparatus 120 is turned ON and OFF by having the warning control apparatus 124 turn an auxiliary power source switch 182, described further below, ON and OFF. The warning sound control section 164 controls the warning sound output apparatus 122. In the first embodiment, the warning control apparatus 124 turns the warning sound output apparatus 122 ON and OFF by turning the auxiliary power source switch 182, described further below, ON and OFF.

[A-1-7. First Battery 30 and Second Battery 32]

The first battery 30 supplies power to the sensor group 20, the communication apparatus 22, the flight control apparatus 24, the propeller drive section 26 (propeller actuators 102), and the warning control apparatus 124, via a first power supply line 170. The power supplied to the warning control apparatus 124 from the first battery 30 is supplied to only the monitoring section 160 of the warning control apparatus 124. A main power source switch 172 that is turned ON and OFF by a manipulation made by a user is arranged on the first power supply line 170. In the following description, the route through which power from the first battery 30 is transmitted is also referred to as a first power system 174.

The second battery 32 supplies power to the communication apparatus 22, the light projection apparatus 120, the warning sound output apparatus 122, and the warning control apparatus 124, via a second power line 180. The power supplied to the warning control apparatus 124 from the second battery 32 is supplied to each of the monitoring section 160, the light projection control section 162, and the warning sound control section 164. The second power line 180 includes the auxiliary power source switch 182 that is turned ON and OFF by the warning control apparatus 124. In the following description, the route through which power from the second battery 32 is transmitted is also referred to as a second power system 184.

When the main power source switch 172 is ON, the monitoring section 160 of the warning control apparatus 124 monitors whether the necessary power is being supplied to the propeller actuators 102. This monitoring is for judging whether the propeller rotational velocity Np exceeds a rotational velocity threshold value THnp, for example. The rotational velocity threshold value THnp is a threshold value for judging whether the propellers 100 are rotating (thereby judging whether power is being supplied to the propeller actuators 102).

If the necessary power is being supplied to the propeller actuators 102, the warning control apparatus 124 turns OFF the auxiliary power source switch 182. Accordingly, the light projection apparatus 120 and the warning sound output apparatus 122 (as well as the light projection control section 162 and the warning sound control section 164) do not operate.

On the other hand, if the necessary power is not being supplied to the propeller actuators 102, the warning control apparatus 124 turns ON the auxiliary power source switch 182. In this way, power is supplied from the second battery 32 to the warning control apparatus 124, the light projection apparatus 120, and the warning sound output apparatus 122 (each of the monitoring section 160, the light projection control section 162, and the warning sound control section 164). Accordingly, the warning sound output apparatus 122 (monitoring section 160) is kept in the ON state, and the light projection apparatus 120 and the warning sound output apparatus 122 (as well as the light projection control section 162 and the warning sound control section 164) operate.

Since the operation of the warning control apparatus 124 is maintained even when the supply power of the first battery 30 drops, a capacitor or the like for supplying power to the warning control apparatus 124 may be provided separately from the first battery 30 and the second battery 32.

[A-1-8. Posture Stabilizing Wings 52]

The posture stabilizing wings 52 (also referred to below as "wings 52") are provided on a side surface of the drone body 50 to stabilize the posture of the drone 12 when descending. The wings 52 are arranged at uniform intervals on the side surface of the drone body 50. Furthermore, the wings 52 are provided at angles relative to the up-down direction of the drone 12.

In this way when the drone 12 falls, the wings 52 act to provide rotational force to the drone body 50. Accordingly, even in a state where the propellers 100 are stopped, the drone 12 falls along the direction of the rotational axes Az (directions of the rotational center axes) of the propellers 100. Furthermore, in a case where the propellers 100 have movable mechanisms with changeable rotational axes Ax, the wings 52 are provided such that the drone 12 falls along the direction of the rotational axes Az when the propellers 100 are at a reference position (initial position). Accordingly, it is possible to stabilize the posture of the drone 12 when falling.

<A-2. Control of the First Embodiment>

[A-2-1. Basics]

In the first embodiment, the flight control apparatus 24 performs in-flight image capturing control. Furthermore, the warning control apparatus 124 performs warning control.

[A-2-2. In-Flight Image Capturing Control]

When the user turns ON the main power source switch 172, the flight control apparatus 24 is activated by the power from the first battery 30. While the flight control apparatus 24 is ON, the flight control apparatus 24 stores the image Id of the camera 64 in the storage section 84.

Alternatively, the flight control apparatus 24 may limit the storage of the image Id of the camera 64 if the drone 12 is not in flight, and may store the image Id of the camera 64 in the storage section 84 if the drone 12 is in flight.

[A-2-3. Warning Control]

Figure 3:
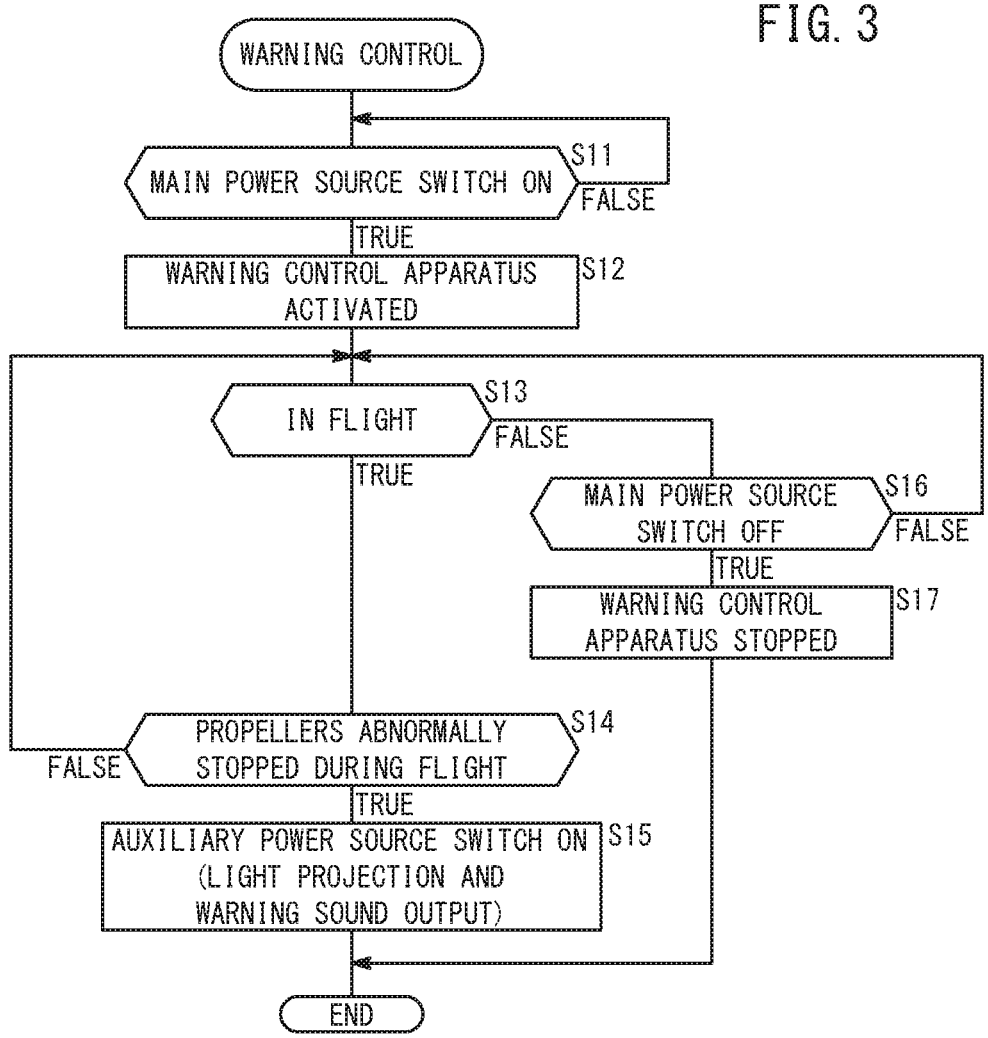
FIG. 3 is a flow chart of warning control in the first embodiment.

FIG. 3 is a flow chart of the warning control in the first embodiment. At step S11, when the user turns ON the main power source switch 172 (S11: TRUE), the power from the first battery 30 is supplied to the first power system 174 (FIG. 1). In this way, the warning control apparatus 124 is activated (S12 of FIG. 3). If the main power source switch 172 is OFF (S11: FALSE), the warning control apparatus 124 is in a stopped state.

At step S13, the warning control apparatus 124 judges whether the drone 12 is in flight. This judgment is performed based on whether a deviation ΔH (referred to below as the "altitude deviation ΔH") between a current value of the altitude H detected by the altimeter 60 and an initial value is greater than or equal to a deviation threshold value THΔH, for example. If the altitude deviation ΔH is greater than or equal to the deviation threshold value THΔH, it is judged that flight has started (in other words, that the drone 12 is in flight).

Furthermore, if the up-down acceleration Gz detected by the acceleration sensor 62 continues to be zero for a prescribed time after flight has started, when the propeller rotational velocity Np becomes zero, the warning control apparatus 124 judges that the flight has ended correctly. The normal ending of a flight may be judged using another method. If the drone 12 is in flight (S13: TRUE), the process moves to step S14.

At step S14, the warning control apparatus 124 judges whether the propellers 100 have abnormally stopped during flight. This judgment is performed based on whether the propeller rotational velocity Np is less than or equal to a rotational velocity threshold value THnp and the up-down acceleration Gz is below a negative acceleration threshold value −THgz. If the propeller rotational velocity Np is less than or equal to the rotational velocity threshold value THnp and the up-down acceleration Gz is below the negative acceleration threshold value −THgz, the warning control apparatus 124 judges that the propellers 100 have abnormally stopped during flight. If the propeller rotational velocity Np is not less than or not equal to the rotational velocity threshold value THnp or if the up-down acceleration Gz is not below the negative acceleration threshold value −THgz, the warning control apparatus 124 judges that the propeller actuators 102 are not abnormally stopped. If the propellers 100 are not abnormally stopped during flight (S14: FALSE), the process returns to step S13. If the propellers 100 are abnormally stopped during flight (S14: TRUE), the process moves to step S15.

At step S15, the warning control apparatus 124 turns ON the auxiliary power source switch 182. In this way, the light projection apparatus 120 radiates the visible light 300 downward from the drone 12 (basically in the direction of gravity) and the warning sound output apparatus 122 outputs the warning sound 302 downward from the drone 12 (basically in the direction of gravity) (FIG. 2). With the warning control of the first embodiment (FIG. 3), when the auxiliary power source switch 182 is turned ON, the warning control apparatus 124 keeps the auxiliary power source switch 182 ON until the power of the second battery 32 runs out. Instead, the warning sound output apparatus 122 may turn OFF the auxiliary power source switch 182 when the drone 12 contacts a ground surface 350. Whether or not the drone 12 has contacted the ground surface 350 may be judged based on whether the up-down acceleration Gz has become zero (therefore, it is necessary to include the acceleration sensor 62 in the second power system 184).

Returning to step S13, if the drone 12 is not in flight (S13: FALSE), the process moves to step S16. If the main power source switch 172 is not OFF (S16: FALSE), the process returns to step S13. If the main power source switch 172 is OFF (S16: TRUE), the supply of power from the first battery 30 is stopped. In this case, the warning control apparatus 124 stops (S17).

<A-3. Effect of the First Embodiment>

According to the first embodiment, a warning is issued downward or in the direction of gravity (velocity vector direction) from the drone 12 (flying body) (FIG. 2 and S15 of FIG. 3). Accordingly, when the drone 12 moves (here, falls) downward or in the direction of gravity, nearby people and the like can easily recognize the presence of the drone 12.

In the first embodiment, the warning apparatus 28 includes the light projection apparatus 120 that radiates the visible light 300 downward or in the direction of gravity (velocity vector direction) from the drone 12 (flying body) (FIGS. 1 and 2). In this way, the visible light 300 is radiated downward or in the direction of gravity from the drone 12 (FIG. 2 and S15 of FIG. 3). Accordingly, when the drone 12 falls downward or in the direction of gravity, for example, nearby people and the like can easily recognize the presence of the drone 12 due to the visible light 300.

In the first embodiment, the light projection apparatus 120 radiates the visible light 300 along the rotational axes Az (direction of the rotational center axis lines) of the propellers 100 (rotating wings) of the drone 12 (flying body) (FIG. 2). In this way, by fixing the radiation direction of the visible light 300 relative to the rotational axes Az of the propellers 100 or the drone body 50 of the drone 12, it is possible to easily radiate the visible light 300 downward from the drone 12.

In the first embodiment, the drone 12 (flying body) includes the propeller actuators 102 (propulsion source), the first battery 30 (first power source) that drives the propeller actuators 102, and the second battery 32 (second power source) that is different from the first battery 30 and drives the warning apparatus 28 (FIG. 1). In this way, even when an abnormality occurs in the first power system 174 that includes the first battery 30 (S14 of FIG. 3: TRUE), it is possible to drive the warning apparatus 28 with the second battery 32 and provide a warning downward or in the direction of gravity from the drone 12.

In the first embodiment, the drone 12 (flying body) includes the posture stabilizing wings 52 (posture stabilizing portion) that stabilize the posture of the drone 12 when descending (FIG. 2). In this way, when the drone 12 descends, it is possible to stabilize the direction of the warning.

In the first embodiment, the warning apparatus 28 includes the warning sound output apparatus 122 that outputs the warning sound 302 downward or in the direction of gravity (velocity vector direction) from the drone 12 (flying body) (FIGS. 1 and 2). In this way, the warning sound 302 is output downward or in the direction of gravity from the drone 12 (flying body) (FIG. 2 and S15 of FIG. 3). Accordingly, when the drone 12 moves downward or in the direction of gravity, the presence of the drone 12 can be easily recognized from the surrounding region.

B. Second Embodiment

<B-1. Configuration (Differences from the First Embodiment)>

[B-1-1. Overall Configuration]

Figure 4:
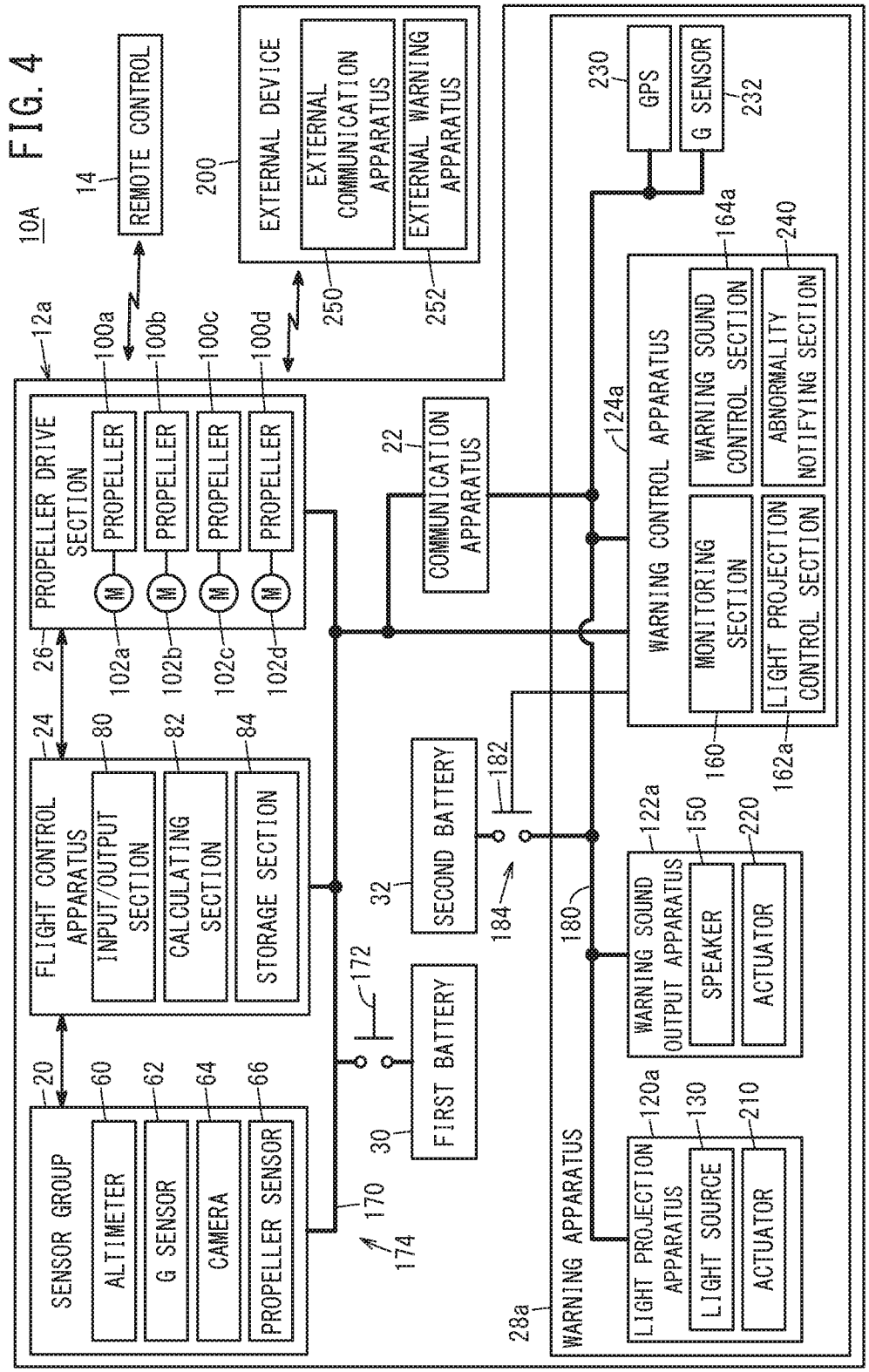
FIG. 4 is an overall configurational diagram of the basics of a drone system that includes a drone serving as a flying body, according to a second embodiment of the present invention.
Figure 5:
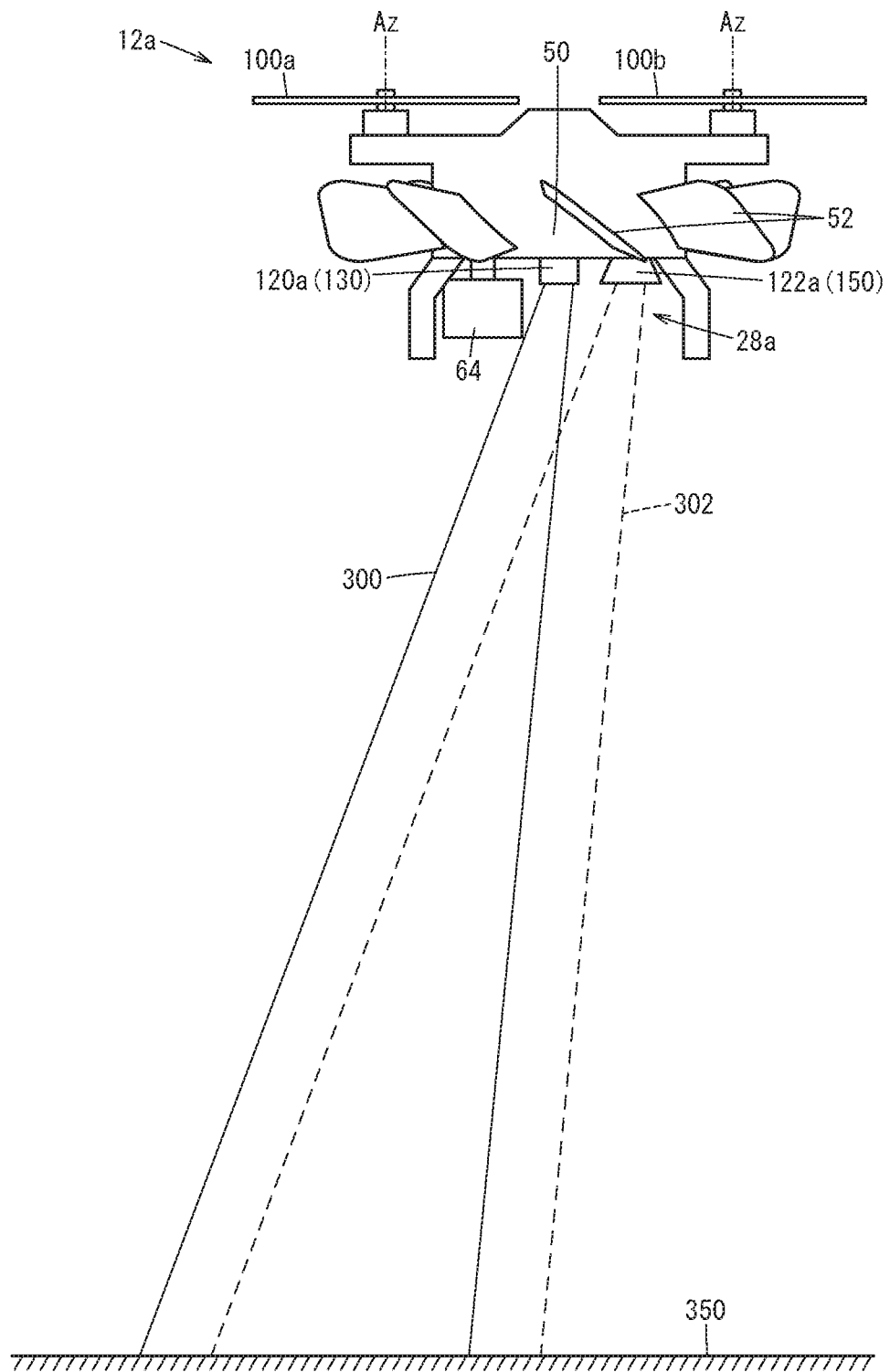
FIG. 5 shows an example of a usage state of the drone according to the second embodiment.

FIG. 4 is an overall configurational diagram of the basics of a drone system 10A that includes a drone 12a serving as a flying body, according to a second embodiment of the present invention. FIG. 5 shows an example of a usage state of the drone 12a according to the second embodiment. The drone system 10A includes, in addition to the drone 12a and the remote control 14, an external device 200 (FIG. 4). In the following description, configurational components that are the same as those in the first embodiment are given the same reference numerals, and detailed descriptions thereof are omitted.

[B-1-2. Drone 12a]

The drone 12a of the second embodiment basically has the same configuration as the drone 12 of the first embodiment, except for the differences described below.

The light projection apparatus 120 of the first embodiment includes the light source 130 (FIG. 1). In contrast to this, a light projection apparatus 120a of the second embodiment includes a light source actuator 210 in addition to the light source 130. The light source actuator 210 adjusts the radiation direction of the visible light 300 by changing the orientation of the light source 130.

Furthermore, the warning sound output apparatus 122 of the first embodiment includes the speaker 150 (FIG. 1). In contrast to this, a warning sound output apparatus 122a of the second embodiment includes a speaker actuator 220 in addition to the speaker 150. The speaker actuator 220 adjusts the output direction of the warning sound 302 by changing the orientation of the speaker 150.

Furthermore, the warning apparatus 28 of the first embodiment includes the light projection apparatus 120, the warning sound output apparatus 122, and the warning control apparatus 124 (FIG. 1). In contrast to this, a warning apparatus 28a of the second embodiment includes, in addition to the light projection apparatus 120a, the warning sound output apparatus 122a, and a warning control apparatus 124a, a global positioning system sensor 230 (referred to below as a "GPS sensor 230") and a second acceleration sensor 232 (progression direction detecting section (FIG. 4).

The GPS sensor 230 detects the current position Pdcur of the drone 12a. The second acceleration sensor 232 detects the acceleration G of the drone 12a, in the same manner as the acceleration sensor 62. The acceleration G indicates the progression direction of the drone 12a. By including the acceleration sensor 62 of the sensor group 20 not only in the first power system 174 but also in the second power system 184, the acceleration sensor 62 may be used as the second acceleration sensor 232.

Figure 6:
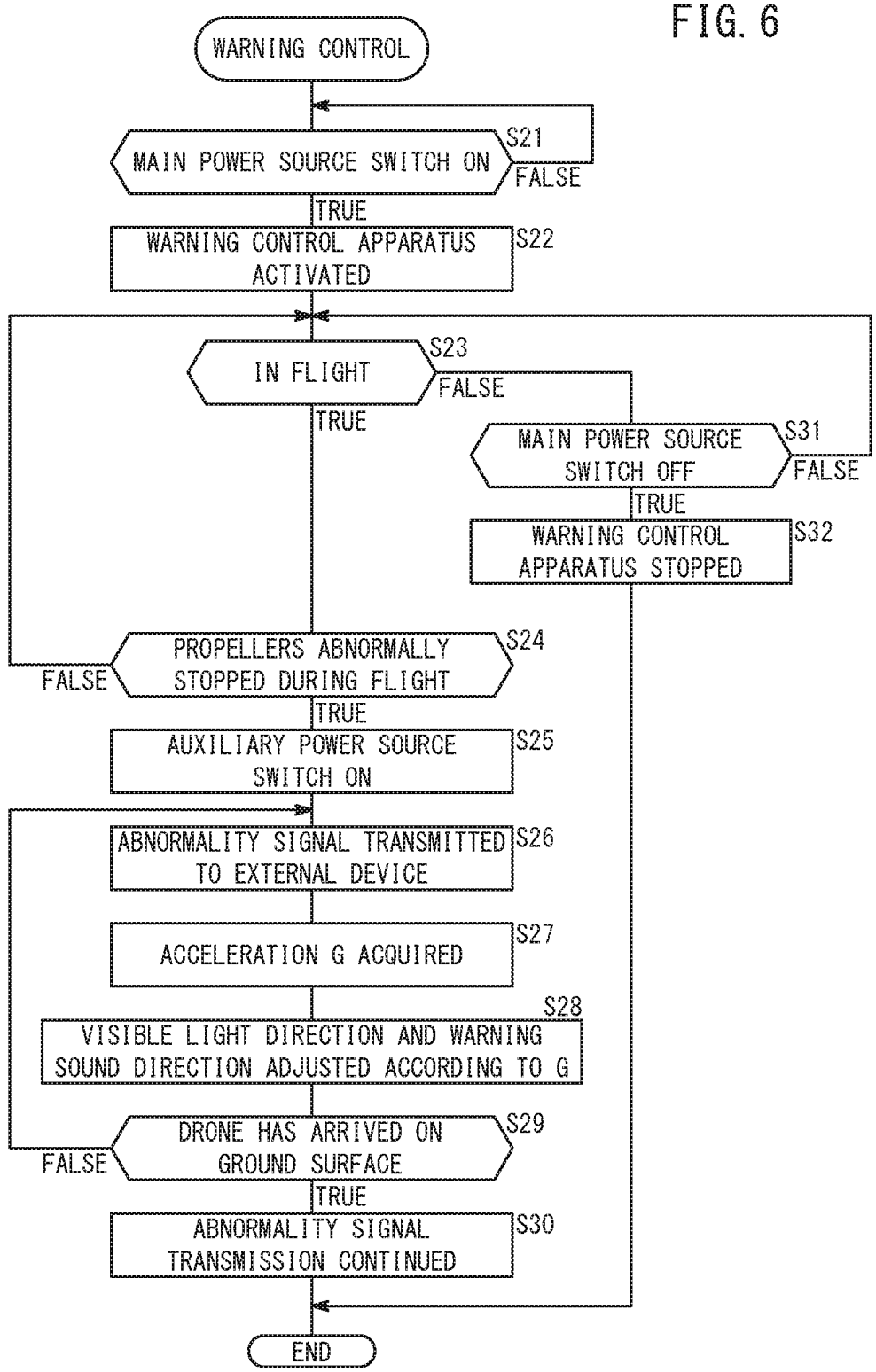
FIG. 6 is a flow chart of warning control in the second embodiment.

The light projection control section 162 of the first embodiment controls whether the light source 130 is ON or OFF (FIG. 1 and S15 of FIG. 3). In contrast to this, a light projection control section 162a of the second embodiment controls the light source actuator 210, in addition to the ON/OFF state of the light source 130 (FIG. 4 and S28 of FIG. 6). The light projection control section 162 controls the light source actuator 210 to radiate the visible light 300 in the progression direction of the drone 12a.

The warning control apparatus 124 of the first embodiment includes the monitoring section 160, the light projection control section 162, and the warning sound control section 164 (FIG. 1). In contrast to this, the warning control apparatus 124a of the second embodiment includes an abnormality notifying section 240 in addition to the monitoring section 160, the light projection control section 162a, and a warning sound control section 164a.

The abnormality notifying section 240 outputs an abnormality signal So that provides notification of an abnormality to the external device 200, when an abnormality occurs in the first power system 174 that includes the first battery 30. The abnormality notifying section 240 is included in the second power system 184, but not included in the first power system 174. Accordingly, the abnormality notifying section 240 is activated when the monitoring section 160 turns ON the auxiliary power source switch 182. Alternatively, the abnormality notifying section 240 may be included in both the first power system 174 and the second power system 184.

[B-1-3. External Device 200]

The external device 200 issues a prescribed warning based on the abnormality signal So from the abnormality notifying section 240. As shown in FIG. 4, the external device 200 includes an external communication apparatus 250 and an external warning apparatus 252. The external communication apparatus 250 performs wireless communication with the communication apparatus 22 of the drone 12a, and includes a wireless antenna. Alternatively, in a case where the communication apparatus 22 is capable of wireless communication with a wireless base station connected to the Internet, the external communication apparatus 250 may be connected wirelessly or in a wired manner to the Internet.

The external warning apparatus 252 issues a prescribed warning according to the abnormality signal So from the drone 12a. The external warning apparatus 252 includes a plurality of second speakers (not shown in the drawings). The external warning apparatus 252 causes the warning sound 302 to be output from a second speaker corresponding to the current position Pdcur of the drone 12a included in the abnormality signal So. Alternatively, the external warning apparatus 252 displays the current position Pdcur of the drone 12a included in the abnormality signals So in a display screen of an application such as a PC, along with map information Imap.

<B-2. Control of the Second Embodiment>
[B-2-1. Basics]

The control of the second embodiment is basically the same as the control of the first embodiment. However, in the warning control of the second embodiment, the visible light 300 is radiated in the progression direction of the drone 12a. Furthermore, when an abnormality occurs in the first power system 174 that includes the first battery 30, with the warning control of the second embodiment, notification about the abnormality is provided to the external device 200 from the drone 12a (abnormality notifying section 240).

[B-2-2. Warning Control]

FIG. 6 is a flow chart of the warning control of the second embodiment. Steps S21, S22, S23, S24, S25, S31, and S32 are basically the same as steps S11, S12, S13, S14, S15, S16, and S17 of FIG. 3.

If the propellers 100 are abnormally stopped during flight (S24: TRUE), the auxiliary power source switch 182 is switched ON (S25) and the warning control apparatus 124a performs the process described below. Specifically, at step S26, the abnormality notifying section 240 transmits the abnormality signal So to the external device 200. The external device 200 that has received the abnormality signal So performs the prescribed warning using the external warning apparatus 252. This prescribed warning can be having the external warning apparatus 252 cause the warning sound 302 to be output from the second speaker corresponding to the current position Pdcur of the drone 12a included in the abnormality signal So. Alternatively, the external warning apparatus 252 displays the current position Pdcur of the drone 12a included in the abnormality signal So in the display screen of an application such as a PC, along with the map information Imap.

At step S27, the light projection control section 162a acquires the acceleration G from the second acceleration sensor 232. At step S28, the light projection control section 162a adjusts the radiation direction of the visible light 300 according to the acceleration G, and the warning sound control section 164a adjusts the output direction of the warning sound 302 according to the acceleration G. That is, the light projection control section 162a changes the orientation of the light source actuator 210 to radiate the visible light 300 in the progression direction of the drone 12a. Furthermore, the warning sound control section 164a changes the orientation of the speaker actuator 220 to output the warning sound 302 in the progression direction of the drone 12a.

At step S29, the warning control apparatus 124a judges whether the drone 12a has arrived at the ground surface 350. This judgment is performed based on whether the acceleration G has become zero, for example. If the drone 12a has not arrived at the ground surface 350 (S29: FALSE), the process returns to step S26. If the drone 12a has arrived at the ground surface 350 (S29: FALSE), the process moves to step S30.

At step S30, the warning control apparatus 124a continues transmitting the abnormality signal So, until the power of the second battery 32 runs out. In this way, the user can learn the current position Pdcur of the drone 12a via the external device 200. Accordingly, it is possible to quickly recover the drone 12a. Alternatively, the warning control apparatus 124a may stop the transmission of the abnormality signal So when a prescribed condition other than the power of the second battery 32 running out is realized.

<B-3. Effect of the Second Embodiment>

According to the second embodiment described above, it is possible to realize the effects described below in addition to or instead of the effects of the first embodiment.

Specifically, in the second embodiment, the light projection apparatus 120a includes the light source 130 that generates the visible light 300 and the light source actuator 210 that adjusts the radiation direction of the visible light 300 (FIG. 4). Furthermore, the drone 12a (flying body) includes the second acceleration sensor 232 (direction detecting section) that detects the progression direction (velocity vector direction) of the drone 12a and the light projection control section 162a that controls the light source 130 and the light source actuator 210 (FIG. 4). Yet further, the light projection control section 162a controls the light source actuator 210 to radiate the visible light 300 in the progression direction of the drone 12a (FIG. 5 and S28 of FIG. 6). In this way, even when the drone 12a moves in a direction diagonal to the direction of gravity (FIG. 5), the presence of the drone 12a can be easily recognized from the predicted arrival position on the ground and its surrounding region.

In the second embodiment, if an abnormality has occurred in the first power system 174 including the first battery 30 (first power source) (S24: TRUE of FIG. 6), the warning apparatus 28a includes the abnormality notifying section 240 that outputs the abnormality signal So providing notification about the abnormality to the external device 200 (FIG. 4). In this way, when an abnormality occurs in the first power system 174 and the propellers 100 (rotating wings) do not operate correctly, it is possible to take countermeasures via the external device 200.

C. Modifications

The present invention is not limited to the above-described embodiment, and it goes without saying that various modifications could be adopted therein without departing from the essence and gist of the present invention.

<C-1. Flying Body>

In the first embodiment, the present invention is applied to the drone 12 (FIGS. 1 and 2). However, from the viewpoint of providing a warning downward or in the direction of gravity from the flying body, for example, the present invention may be provided to a different type of flying body. The present invention can also be applied to a helicopter instead of the drone 12, for example. The same is true for the second embodiment.

The drone 12 of the first embodiment flies according to an input manipulation made by the user to the remote control 14. However, from the viewpoint of providing the warning downward or in the direction of gravity from the flying body, for example, the present invention is not limited to this. As an example, the drone 12 may fly along a route designated from an external server (not shown in the drawings) and transmit the image Id to this server.

<C-2. Rotating Wings>

In the first embodiment, the propellers 100 are used as the rotating wings that generate lift (FIGS. 1 and 2). However, from the viewpoint of generating lift, for example, it is possible to use other rotating wings (e.g. a rotor for a helicopter). Furthermore, the present invention can be applied to a flying body that flies without using rotating wings (e.g. a vertical take-off and landing (VTOL) machine). The same is true for the second embodiment.

<C-3. Warning Apparatuses 28 and 28a>

The warning apparatus 28 of the first embodiment includes the light projection apparatus 120 and the warning sound output apparatus 122 (FIG. 1). However, from the viewpoint of providing the warning downward or in the direction of gravity from the drone 12 (flying body), for example, the present invention is not limited to this. As an example, one of the light projection apparatus 120 and the warning sound output apparatus 122 can be omitted. The same is true for the second embodiment.

<C-4. Power Source>

In the first embodiment, the first battery 30 and the second battery 32 are used as the first power source and the second power source (FIG. 1). However, from the viewpoint of supplying power to the first power system 174 and the second power system 184, power sources other than batteries can be used as the first power source and the second power source. For example, a capacitor can be used as a power source other than a battery. The same is true for the second embodiment.

In the first embodiment, the first battery 30 and the second battery 32 are provided as power sources (FIG. 1). However, from the viewpoint of providing the warning after the propellers 100 have abnormally stopped during flight, the present invention is not limited to this. As an example, there could be a case where, when the voltage with which the propeller actuators 102 can operate is relatively high and the voltage at which the warning apparatus 28 can operate is relatively low, the warning apparatus 28 can operate with the power from the first battery 30 even though the propeller actuators 102 cannot operate. In such a case, the second battery 32 can be omitted. The same is true for the second embodiment.

<C-5. Posture Stabilizing Portion>

In the first embodiment, the posture stabilizing wings 52 are used as the posture stabilizing portion that stabilizes the posture of the drone 12 (flying body) when descending (FIG. 2). However, from the viewpoint of stabilizing the posture of the drone 12 (flying body) when descending, for example, the present invention is not limited to this. As an example, the posture stabilizing portion may be provided on the bottom side of the drone body 50 of the drone 12. Furthermore, from the viewpoint of providing the warning downward or in the direction of gravity from the drone 12 (flying body), for example, the posture stabilizing wings 52 (posture stabilizing portion) can be omitted. The same is true for the second embodiment.

<C-6. Warning Control (FIGS. 3 and 6)>

In the warning control of the first embodiment (FIG. 3), if the propellers 100 have abnormally stopped during flight (S14: TRUE), the light projection apparatus 120 and the warning sound output apparatus 122 are caused to operate (S15). However, from the viewpoint of providing the warning downward or in the direction of gravity from the flying body when the flying body moves downward or in the direction of gravity, for example, the timing at which the warning is provided is not limited to this. As an example, the light projection apparatus 120 and the warning sound output apparatus 122 may be caused to operate when the drone 12 lands correctly. The same is true for the warning control of the second embodiment (FIG. 6).

In the warning control of the first embodiment (FIG. 3), by turning ON the auxiliary power source switch 182 (S15 of FIG. 3), the light projection apparatus 120, the warning sound output apparatus 122, and the warning control apparatus 124 (light projection control section 162 and warning sound control section 164) are turned ON (FIG. 1). However, from the viewpoint of providing the warning downward or in the direction of gravity from the flying body when the flying body moves downward or in the direction of gravity, for example, the present invention is not limited to this. As an example, the altimeter 60 may be turned ON when the auxiliary power source switch 182 is turned ON. Then, it is possible to increase the brightness (light energy) of the visible light 300 or the volume of the warning sound 302 as the altitude H becomes lower. The same is true for the second embodiment.

In the warning control of the second embodiment (FIG. 6), the light projection control section 162 controls the light source actuator 210 to radiate the visible light 300 in the progression direction of the drone 12a (S28). However, from the viewpoint of providing the warning downward or in the direction of gravity from the flying body when the flying body moves downward or in the direction of gravity, for example, the present invention is not limited to this. As an example, people, animals, or apparatuses located at or near the predicted arrival position on the ground can be detected based on the image Id of the camera 64, and the light source actuator 210 can be controlled to radiate the visible light 300 toward these people and the like.

In this case, it is necessary to turn ON the camera 64 and an image recognizing section (provided to the calculating section 82) when the auxiliary power source switch 182 is turned ON. Furthermore, by radiating the visible light 300 in the progression direction of the drone 12a before detecting the people and the like, it becomes easier to perform the image recognition with the image Id of the camera 64.

In the first embodiment, an example is described of a case in which the process returns to step S13 if the propellers 100 are not abnormally stopped during flight (S14: FALSE), but the present invention is not limited to this. If the propellers 100 are not abnormally stopped during flight (S14: FALSE), the warning control apparatus 124 may judge whether the flight angle of the drone 12 is normal. Then, if the flight angle of the drone 12 is normal, the process may return to step S13. On the other hand, if the flight angle of the drone 12 is not normal, the process may move to step S15.

In the second embodiment, an example is described of a case in which the process returns to step S23 if the propellers 100 are not abnormally stopped during flight (S24: FALSE), but the present invention is not limited to this. If the propellers 100 are not abnormally stopped during flight (S24: FALSE), the warning control apparatus 124a may judge whether the flight angle of the drone 12a is normal. Then, if the flight angle of the drone 12a is normal, the process may return to step S23. On the other hand, if the flight angle of the drone 12a is not normal, the process may move to step S25.

In the second embodiment, an example is described of a case in which the light projection apparatus 120a is provided only on the bottom side of the drone body 50 of the drone 12a, but a light projection apparatus (not shown in the drawings) may be further provided on the top side of the drone body 50 of the drone 12a. In this case, the light projection control section 162a may be provided with a gyro function for radiating the visible light 300 in the progression direction of the drone 12a even when the drone 12a is inclined. The light projection control section 162a having the gyro function changes the orientation of the light source actuator 210 to radiate the visible light 300 in the progression direction of the drone 12a. The light projection apparatus 120a provided on the bottom side of the drone 12a and the light projection apparatus 120a provided on the top side of the drone 12a may be switched between by the light projection control section 162a according to the angle of the drone 12a when the drone 12a is falling.

REFERENCE SIGNS LIST 12, 12a: drone (flying body)
28, 28a: warning apparatus
30: first battery (first power source)
32: second battery (second power source)
52: posture stabilizing wing (posture stabilizing portion)
102a, 102b, 102c, 102d: propeller actuator (propulsion source)
120, 120a: light projection apparatus
122, 122a: warning sound output apparatus
130: light source
162a: light projection control section
174: first power system
200: external device
210: light source actuator
232: second acceleration sensor (progression direction detecting section)
240: abnormality notifying section
300: visible light
302: warning sound
Az: rotational axis
So: abnormality signal

What is claimed is:

1. A flying body comprising:
a warning apparatus including an output apparatus configured to output a warning in a velocity vector direction of the flying body when the flying body moves downward or in a direction of gravity,
wherein the output apparatus includes a warning source configured to generate the warning, and an actuator configured to adjust an output direction of the warning,
the flying body further comprising:
a direction detecting section configured to detect the velocity vector direction of the flying body; and
a control section configured to control the warning source and the actuator,
wherein the control section is configured to control the actuator to output the warning in the velocity vector direction detected by the direction detecting section.

2. The flying body according to claim 1, wherein
the output apparatus includes a light projection apparatus configured to radiate visible light in the velocity vector direction of the flying body,
the warning source includes a light source configured to generate the visible light; and
the actuator includes a light source actuator configured to adjust a radiation direction of the visible light,
the control section includes a light projection control section configured to control the light source and the light source actuator, and
wherein the light projection control section is configured to control the light source actuator to radiate the visible light in the velocity vector direction of the flying body.

3. The flying body according to claim 2, wherein the light projection apparatus is configured to radiate the visible light along a rotational center axis direction of a rotating wing of the flying body.

4. The flying body according to claim 1, wherein the flying body includes:
a propulsion source for the flying body;
a first power source configured to drive the propulsion source; and
a second power source that is different from the first power source and is configured to drive the warning apparatus.

5. The flying body according to claim 4, wherein the warning apparatus provides the warning when an abnormality has occurred in a first power system including the first power source.

6. The flying body according to claim 4, wherein the warning apparatus includes an abnormality notifying section that outputs an abnormality signal providing notification about an abnormality to an external device, when the abnormality has occurred in the first power system that includes the first power source.

7. The flying body according to claim 1, wherein the flying body includes a posture stabilizing portion that stabilizes a posture of the flying body when descending.

8. The flying body according to claim 1, wherein the warning apparatus includes a warning sound output apparatus configured to output a warning sound in the velocity vector direction of the flying body.

9. A method for controlling a flying body, the flying body comprising a warning apparatus including an output apparatus having a warning source configured to generate the warning, and an actuator configured to adjust an output direction of the warning; and a control section configured to control the warning source and the actuator,
the method comprising the steps of:
detecting a velocity vector direction of the flying body when the flying body moves downward or in a direction of gravity; and
controlling the actuator to output the warning in the velocity vector direction.

* * * * *